United States Patent
Coeuret et al.

[11] Patent Number: 6,030,196
[45] Date of Patent: Feb. 29, 2000

[54] HYDRAULIC VARIABLE-SPEED GEAR MOTOR SUPPLIED WITH FLUID AND PROVIDING A VARIABLE TORQUE

[75] Inventors: Bernard Coeuret, Epinay sur Odon; André Renot, Franconville, both of France

[73] Assignee: Institut Francais Du Petrole, Rueil-Malmaison, France

[21] Appl. No.: 09/003,467

[22] Filed: Jan. 5, 1998

[30] Foreign Application Priority Data

Jan. 3, 1997 [FR] France .................................. 97 00028

[51] Int. Cl.$^7$ ....................................................... F01C 1/10
[52] U.S. Cl. ............................................. 418/165; 418/270
[58] Field of Search .................................... 418/165, 270

[56] References Cited

U.S. PATENT DOCUMENTS

| | | |
|---|---|---|
| 3,298,284 | 1/1967 | Alexander ..................................... 91/58 |
| 3,506,081 | 4/1970 | Rumsey . |
| 3,688,648 | 9/1972 | D'Amato, Jr. ........................ 91/412 X |
| 3,724,975 | 4/1973 | Bschorer .................................... 418/10 |
| 3,833,317 | 9/1974 | Rumsey ................................. 418/77 X |
| 4,347,700 | 9/1982 | Kantner et al. ............................ 60/325 |

*Primary Examiner*—Timothy S. Thorpe
*Assistant Examiner*—Ehud Gartenberg
*Attorney, Agent, or Firm*—Antonelli, Terry, Stout & Kraus, LLP

[57] ABSTRACT

A variable-speed motor comprising a sun gear (P), at least two planet gears (Si, Si+1), a ring gear (C), an intermediate sector (Zi) between the sides opposite the sun gear (P), opposite the two planet gears (Si, Si+1), and opposite ring gear (C), defining the circulation paths of the drive fluid therewith. The junctions (J(P, Si), J(Si, C), J(Si+1), C), J(P, Si+1)) are impermeable to the drive fluid. The two inlets (Ai, αi+1) and the two returns (Ri, ρi+1) for the drive fluid are provided in sector (Zi) in the vicinity of the junctions; the inlets (Ai, αi+1) and the returns (Ri, ρi+1) are located at two opposite vertices of the quadrilateral.

20 Claims, 7 Drawing Sheets

HYDRAULIC VARIABLE-SPEED GEAR MOTOR SUPPLIED WITH FLUID AND PROVIDING A VARIABLE TORQUE

BACKGROUND OF THE INVENTION

1. Field of the Invention

The present invention relates to a hydraulic variable-speed motor receiving a drive fluid and supplying a torque.

2. Description of the Prior Art

Various types of hydraulic motors exist, for example motors of the "Porcelain" or "Hydroland" type composed of a rotor in which cylinders are formed, with pistons moving in the cylinders to drive a crankshaft in the manner of a radial-piston internal combustion engine.

However, in general, these motors are relatively complicated to build.

U.S. Pat. No. 3,833,317 teaches a hydraulic motor with an epicycloidal assembly able to operate at only two preset rotational speeds.

SUMMARY OF THE INVENTION

Particularly advantageously, the present invention relates to a gear motor able to supply a variable output torque, as well as variable operating speeds.

For this purpose, the invention relates to a gear motor having by an epicycloidal assembly comprising:

- a sun gear (P),
- at least two planet gears (Si, Si+1),
- a ring gear (C),
- an intermediate sector (Zi) in the shape of a curvilinear quadrilateral occupying the space between the sides opposite the sun gear (P), opposite the two neighboring planet gears (Si, Si+1), and opposite ring gear (C), matching their contours and defining the circulation paths of the drive fluid therewith,
- junctions (J(P, Si), J(Si, C), J(Si+1), C), J(P, Si+1)), between sun gear (P), neighboring planet gears (Si, Si+1), and ring gear (C) being impermeable to the drive fluid,
- two inlets (Ai, αi+1) and two returns (Ri, ρi+1) for the drive fluid being provided in sector (Zi) in the vicinity of junctions (J(P, Si), J(Si, C), J(Si+1), C), J(P, Si+1)), the inlets (Ai, αi+1) and the returns (Ri, ρi+1) being located in each case at two opposite vertices of the curvilinear quadrilateral formed by sector (Zi) and,
- a controlled supply (inlet A, return R) of the inlets (Ai, αi+1) and returns (Ri, ρi+1), connected to the hydraulic circuit.

The variable-speed motor according to the invention is extremely simple in design; it has reversible rotation and supplies one variable torque per bearing.

The connection of the various supplies and returns, either completely in parallel or completely in series, or in intermediate combinations, allows a large number of output torques while allowing the pump supplying the hydraulic circuit to operate at a regular speed.

This is particularly important for attachments such as those of farm tractors or the like.

According to other advantageous characteristics of the invention:

- the controlled supply connects inlets (Ai, αi+1) and returns (Ri, ρ+1) in parallel or in series or according to an intermediate combination between a connection totally in series and a connection totally in parallel to modify the torque supplied at the output;
- the controlled supply comprises a movement reverser, particularly in the form of a two-position slide valve distributor;
- the controlled supply comprises a regulating device which, in the case of movement reversal, automatically controls the connection of motors (M1 . . . M3) in parallel whatever their connection position before the movement reversal;
- the regulating device is comprised of a slide with opening portions (P1, P2, P3) of different lengths, this slide being positioned by a control but its end not connected to the control is subject to the pressure prevailing in a chamber of this regulating device, this chamber being connected to one of the passageways (L1, L2) of the reverser and the other end of the distributor is urged by a spring abutting the control element so that the pressure surge generated at the time the reverser reverses the passage of fluid in the chamber causes the slide to move against the force developed by the spring abutting the other end to automatically place all the motors (M1, M2, M3) in parallel whatever the connection diagram of these motors before the reversal.

Preferably, a demultiplication ratio of 1/4 is obtained, with a sun gear of 18 teeth, three planet gears with 9 teeth, and a ring gear with 36 teeth.

According to one particular arrangement, the planet gears have radial channels connecting the bottom of one tooth to the bearing of the planet gear in order to balance said bearings hydrodynamically.

BRIEF DESCRIPTION OF THE DRAWINGS

The present invention will be described in greater detail hereinbelow with reference to the attached drawings wherein.

DESCRIPTION OF THE PREFERRED EMBODIMENTS

Figure 1:
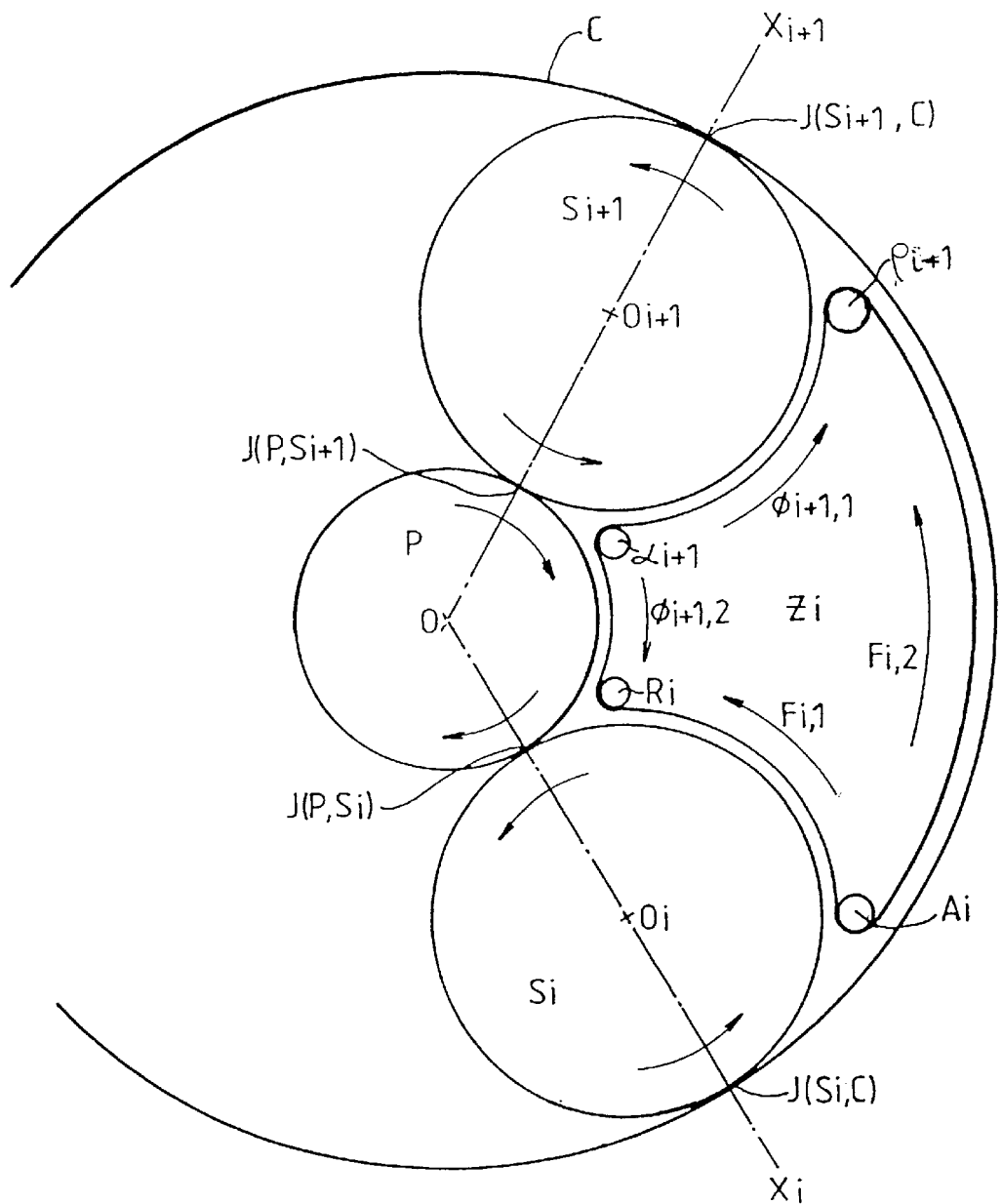
FIG. 1 is a diagram of the hydraulic variable-speed motor according to the invention.

FIG. 1 is a diagram of a hydraulic variable-speed gear motor showing the principle by which this device operates.

This hydraulic variable-speed motor is composed of a sun gear P associated with two planet gears Si, Si+1 and a ring gear C; these various elements, in the form of gears, mesh with each other.

The cavity defined by the curvilinear sectors opposite sun gear P, planet gears Si, Si+1, and the ring gear, accommodates an intermediate segment Zi with curvilinear sides matching the contours of sun gear P, planet gears Si, Si+1, and ring gear C. This intermediate segment forms drive fluid circulation paths by its respective sides, and in each case with sun gear P, planet gears Si, Si+1, and ring gear C.

Each intermediate segment Zi must have curvilinear sides that perfectly match the contours of the various gears that cooperate with these curvilinear sides. This is necessary for leak control: the drive fluid must circulate between the teeth of the gears and not escape therefrom.

Moreover, to minimize leakage, the planet gears must rotate as fast as possible so that the drive fluid is rapidly carried along the circulation paths without having the time to escape outside. The rotational speed is thus also a parameter to be taken into account.

Each intermediate segment Zi also has drive fluid inlets and outlets shown schematically at each of its four vertices.

Thus, an inlet Ai and a return Ri are provided, both associated with planet gear Si. Inlet Ai is at the junction of planet gear Si and ring gear C; return Ri is at the junction of planet gear Si and sun gear P.

Likewise, an inlet αi+1 is provided, at the junction of planet gear Si+1 and sun gear P and a return ρi+1 at the junction of planet gear Si+1 and ring gear C.

It should be emphasized that inlets Ai, αi+1, and returns Ri, ρi+1 are interchangeable as they depend on the direction of circulation of the drive fluid. The inlets define a relative direction of rotation of the sun gear, the planet gears, and the ring gear. Reversal of the direction of circulation of the drive fluid implies that the fluid inlet becomes the return and vice versa; this reverses the direction of rotation of the output of the variable-speed motor.

Sun gear P, planet gears Si, Si+1, and ring gear C are toothed devices that mesh with each other. The gears are cut so that their meshing areas, at the intersection with lines OXi, OXi+1 passing through the centers of the various gears P, Si, Si+1, C, constitute a practically fluidtight barrier. In addition, the outer surfaces of the gear teeth are preferably grooved in a particular shape to distribute the fluid properly.

On line OXi passing through centers O, Oi of sun gear P and planet gear Si and intersecting ring gear C there is a junction point J(P,Si) between sun gear P and planet gear Si, and a junction point J(Si,C) between planet gear Si and ring gear C. These junction points constitute practically liquidtight barriers.

The same applies to line OXi+1 which passes through the center O of sun gear P and center Oi+1 of planet gear Si+1 and intersecting ring gear C. On this line are located junction point J(P,Si+1) corresponding to the contact between sun gear P and planet gear Si+1 as well as junction point (J(Si+1,C) between planet gear Si+1 and ring gear C. These two points also form fluidtight barriers.

This being the case, the system located between the two axis lines OXi, OXi+1 above passing through the center of sun gear P and the center of planet gear Si and the center of planet gear Si+1 respectively, constitutes a closed system; this means that, if the drive fluid is a liquid, the flow entering this system is equal to the flow leaving it, the liquid being incompressible.

Since the gears meshing pairwise rotate in the same direction pairwise the inlets/outlets can only be located at the vertices of sector Zi, near junctions J(P, Si), J(Si, C), J(Si+1), C), J(P, Si+1) and the inlets/outlets are located in each case at the opposite vertices of the quadrilateral forming sector Zi.

It should also be pointed out that, necessarily, planet gears Si and Si+1 are identical gears, namely they have the same number of teeth and the same diameter.

This being the case, the hydraulic variable-speed motor shown in FIG. 1 operates as follows:

The drive fluid from inlet Ai is divided into a flow Fi,1 driving planet gear Si in the direction of the arrow and circulating to return Ri and a flow Fi,2 driving ring gear C in the direction of return ρi+1.

Likewise, inlet αi+1 supplies a flow of liquid Φi+1 driving planet gear Si+1 toward outlet ρi+1 and a flow Φi+1, 2 driving sun gear P toward return Ri.

Since planet gears Si and Si+1 necessarily rotate at the same speed and these planet gears are identical, the flows of fluid associated therewith, Fi, 1 and Φi+1, 1 are the same.

This being the case, flows Fi, 2 and Φi+1, 2 are directly linked to the number of teeth in ring gear C and in sun gear P located between axes OXi and OXi+1. Since the teeth of sun gear P and ring gear C are identical since sun gear P and ring gear C mesh with planet gears Si, Si+1, the relative rotational speed of sun gear P and ring gear C is inversely proportional to their diameters since the diameter is itself proportional to the number of teeth on these three gears.

If the torque (or the motion) is output via sun gear P, there is a first demultiplication ratio corresponding to the ratio of the radii of the teeth of sun gear P and planet gear Si.

If the torque is output via ring gear C, there is a second demultiplication ratio.

An appropriate mechanical connection keys either the ring gear or the sun gear to the output shaft of the system.

A preferred demultiplication ratio is 1/4, with three planet gears each having 9 teeth, a sun gear with 18 teeth, and a ring gear with 36 teeth. This ratio allows a high starting torque, compatible with an easily machinable number of planet gear teeth.

According to another characteristic of the invention, the demultiplication ratio also depends on the supply to inlets Ai, αi according to whether this supply is in parallel or in series.

Figure 2:
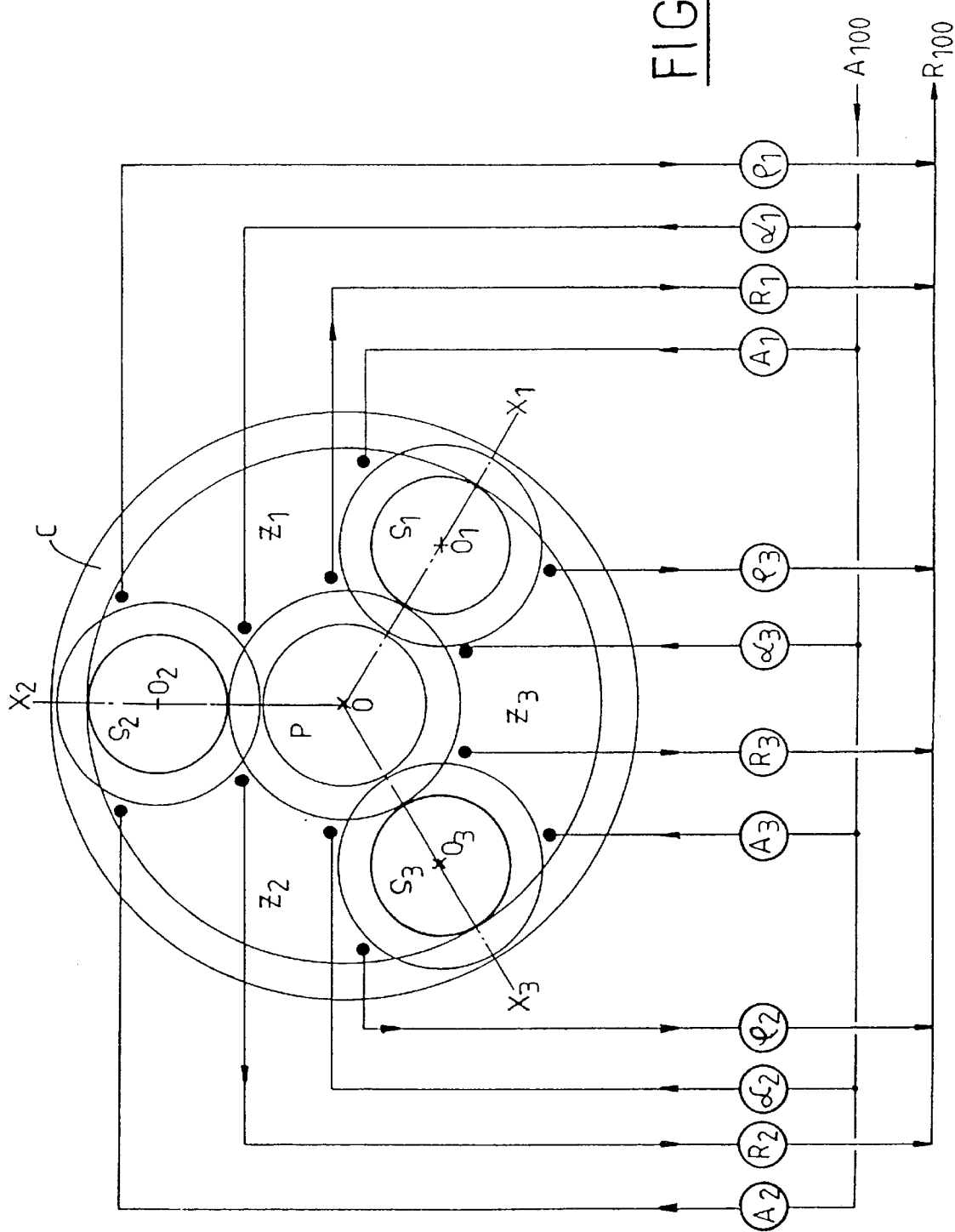
FIG. 2 is a diagram of a variable-speed motor according to the invention with three planet gears and the motors connected in parallel.

FIG. 2 shows a hydraulic variable-speed motor with three planet gears S1, S2, and S3. The various inlets and outlets A1, R1, α1, ρ1, A2, etc. are shown on the lines running directly to the inlets and outlets in sectors Z1, Z2, Z3. The separation axes OX1, OX2, OX3 are also shown.

According to the diagram of FIG. 2, the variable-speed motor is supplied in parallel, namely supplies A1, A2, A3, α1, α2, a3 are connected in parallel. The same applies to returns R1, R2, R3, ρ1, ρ2, ρ3. The common supply is numbered A100 and the common return, R100.

Figure 3B:
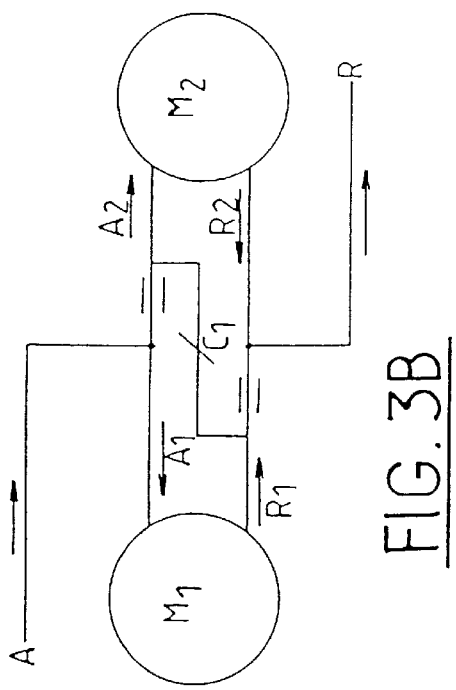
FIGS. 3A and 3B show the details of a parallel connection and the means of accomplishing same.
Figure 3A:
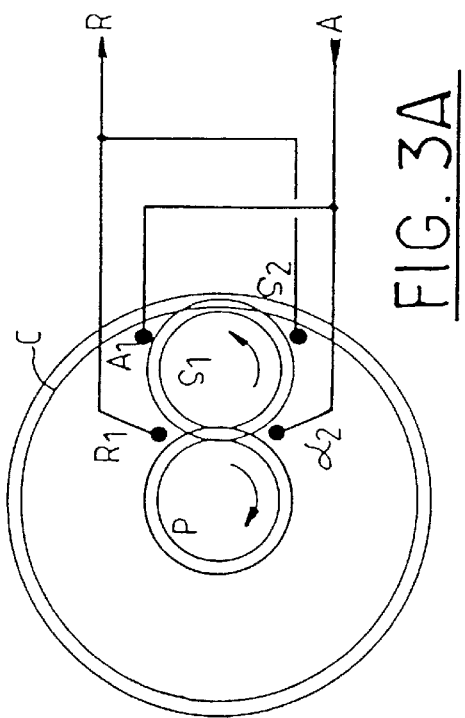

FIG. 3A shows schematically the parallel connection on either side of a planet gear, for example planet gear S1. Supply A is connected to inlet α2 which drives planet gear S1 in the direction of the arrow indicated; the flow arrives at return ρ2 of planet gear S1. This return ρ2 is connected to outlet R.

Another branch of supply A is connected to inlet A1 and the corresponding return R1 is connected to common return R.

Figure 4:
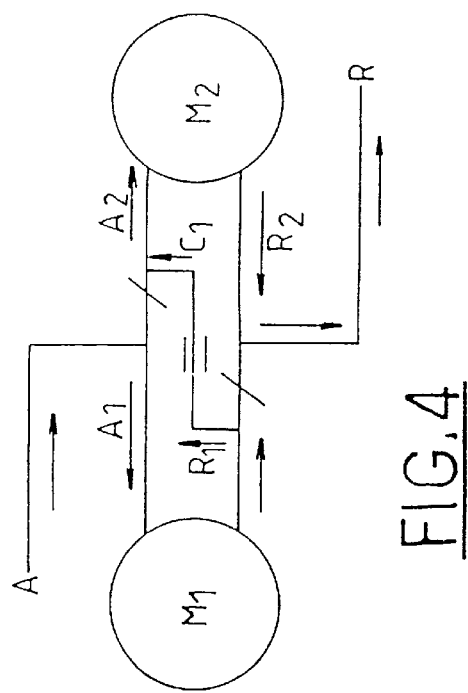
FIG. 4 shows the connection of a motor in series and the means of accomplishing same.

FIGS. 3B, and 4 show the circuit for switching from parallel mode to series mode.

Inlet A1 and return R1 correspond to a "planetary drive" shown schematically by numeral M1; inlet A2 and return R2 correspond to the "planetary drive" shown schematically by numeral M2.

Supply line A is connected by a junction to the two lines A1, A2 that supply "planetary drives" M1, M2 respectively, the returns R1, R2 thereof being connected to common return R.

The connection C1 between inlet A2 and return R1 is closed. Hence the supply is in parallel (FIG. 3B).

On the other hand, in FIG. 4 using the same reference numerals, the connection of inlet A2 is cut off from supply A; the same applies to the connection between return R1 and common return R. On the other hand, connection C1 is open. The drive fluid hence circulates in the direction indicated by the arrows, passing in series through "motor planet gears " M1, M2, namely along path A1 M1, R1, C1, A2, M2, R2, R.

FIGS. 5A, 5B, 5C and 5D show schematically how to connect four "motor planet gears " M1, M2, M3, M4 to switch from connection completely in parallel to connection completely in series.

"Planetary drives " M1 shown in these figures correspond to "planetary drives " M1, M2, etc. described above, namely corresponding in each case to a drive fluid inlet and a drive fluid outlet.

Figure 5B:
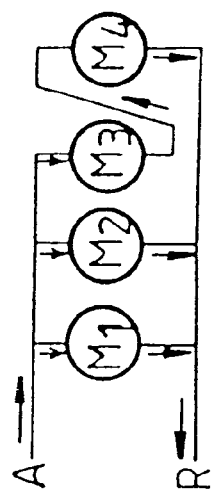
FIGS. 5A, 5B, 5C and 5D show various ways of connecting four motors between a connection completely parallel and a connection completely series in nature.

In the various FIGS. 5A, 5B, 5C and 5D, the "planetary drives " are first connected in parallel between inlet A and return R (FIG. 5A) then the "planetary drives " M3, M4 are connected in series, this group (M3, M4) being itself in parallel with "planetary drives " M1, M2 (FIG. 5B).

Figure 5D:
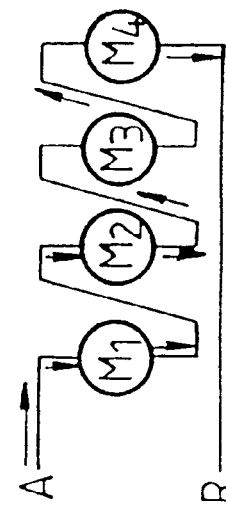
Figure 5A:
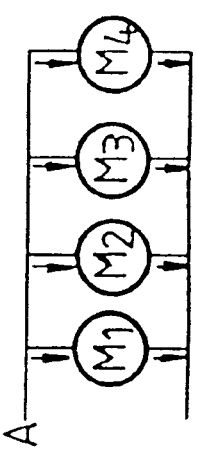
Figure 5C:
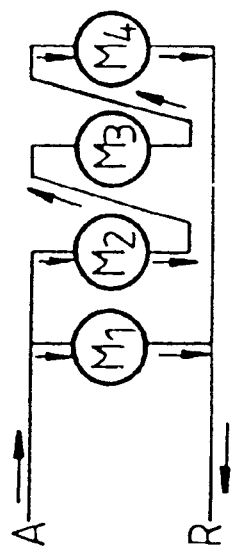

FIG. 5C shows the next stage, with "planetary drive " M2 also connected in series to "planetary drives " M3, M4 and this assembly (M2, M3, M4) of three "planetary drives " in series is connected as a group in parallel with "planetary drive " M1, between fluid inlet A and fluid return R (FIG. 5C).

Finally, with the fourth possibility, all the "planetary drives " M1, M2, M3, M4 are connected in series between inlet A and return R.

In general, the connections in parallel divide the inlet flow between the various branches, resulting in a lower speed but a higher torque at the output. On the other hand, the connection in series (FIG. 5D) causes all the drive fluid to pass through all the "planetary drives": the rotational speed at the output is higher but the torque is lower.

The intermediate connections of FIGS. 5B, and 5C represent intermediate steps between FIGS. 5A and 5D, namely intermediate torques and intermediate speeds.

Figure 6:
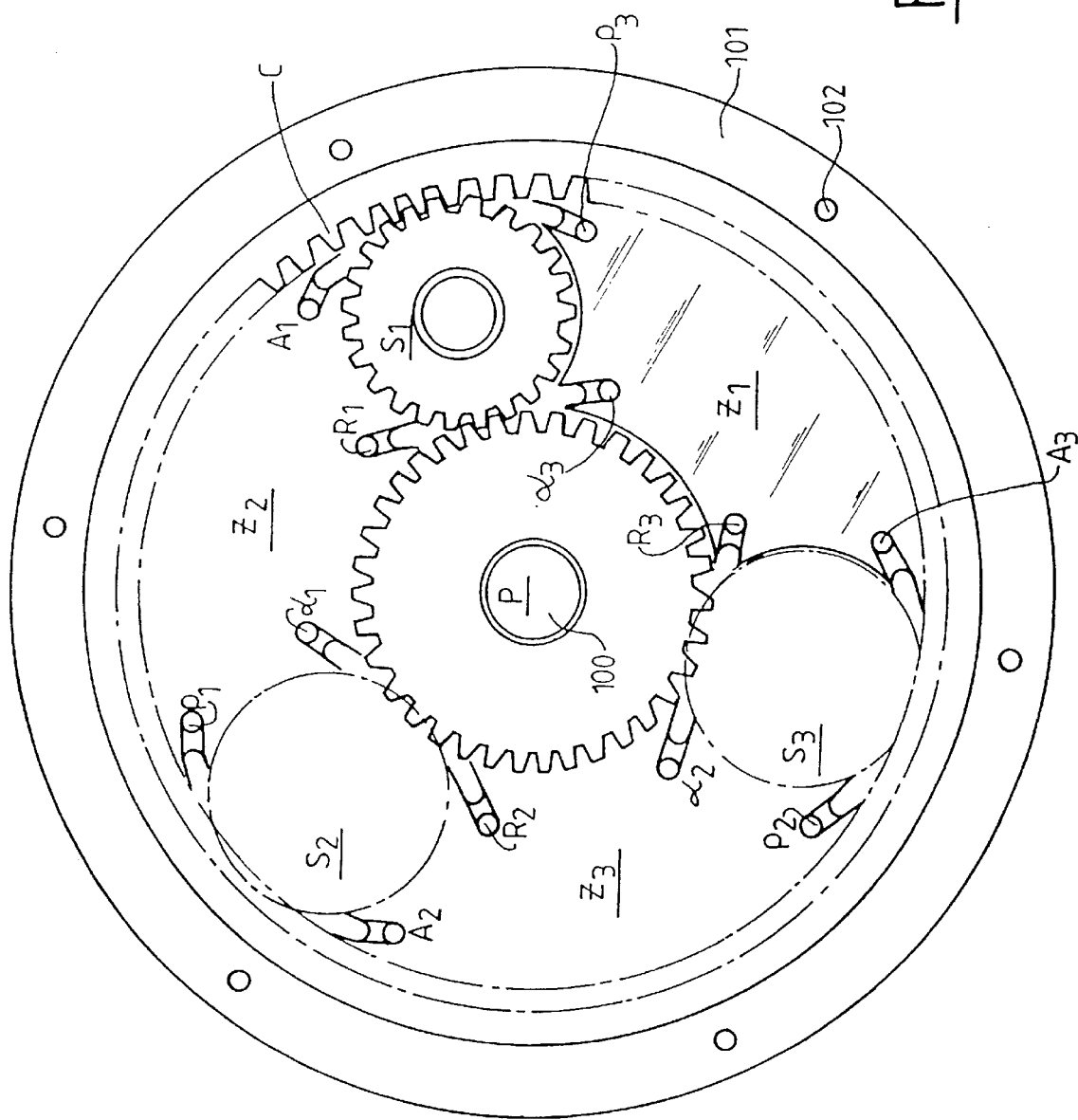
FIGS. 6 and 7 show respectively a top view, with a lid removed, and a cross-sectional view of a hydraulic variable-speed motor according to the invention with three planet gears.
Figure 7:
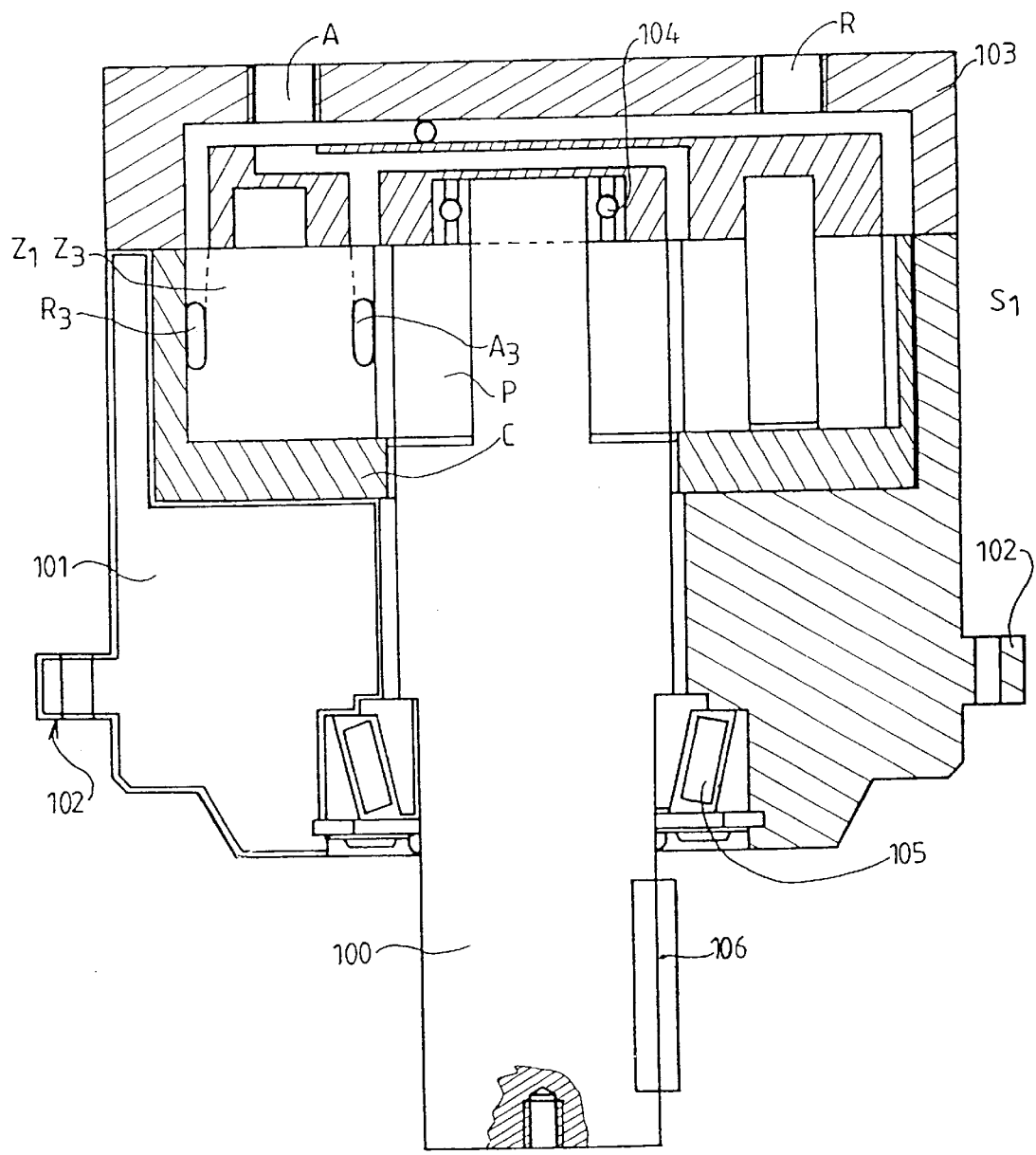

FIGS. 6 and 7 show an embodiment in plane view and in cross-sectional view of a variable-speed motor with a sun gear P, three planet gears S1, S2, S3, and a ring gear C.

The planet gears are separated as before by sectors Z1, Z2, Z3.

This FIG. 6 corresponds for all practical purposes to FIGS. 1 and 2.

FIG. 7 is a cross-sectional view of the device of FIG. 6. This figure shows sun gear P mounted on output shaft 100, meshing with planet gear S1. Planet gear S3 has not been shown but the cavity receiving it is shown. This cavity is delimited by the two sectors Z1, Z3 and ring gear C as well as sun gear P.

Ring gear C is accommodated in gearbox 101 provided with a mounting flange 102.

The assembly thus described is sealed by a lid 103 with a common inlet orifice A and a return orifice R; the various distribution channels (not numbered) lead to openings such as those (A3, R3) shown as examples. The cross sections of these distribution channels are matched to the displacement of the motor, namely the torque and/or the operating speed of the motor. Larger cross sections will be chosen when higher torques and speeds have to be developed. Indeed, the torque is proportional to the pressure-surface area ratio. The surface area is the exposed surface area which depends on the number of planet gear teeth and their geometry.

FIG. 7 also shows the various bearings 104, 105 and key 106 of shaft 100. Ring gear C meshes with shaft 100 by grooves not shown.

Figure 8A:
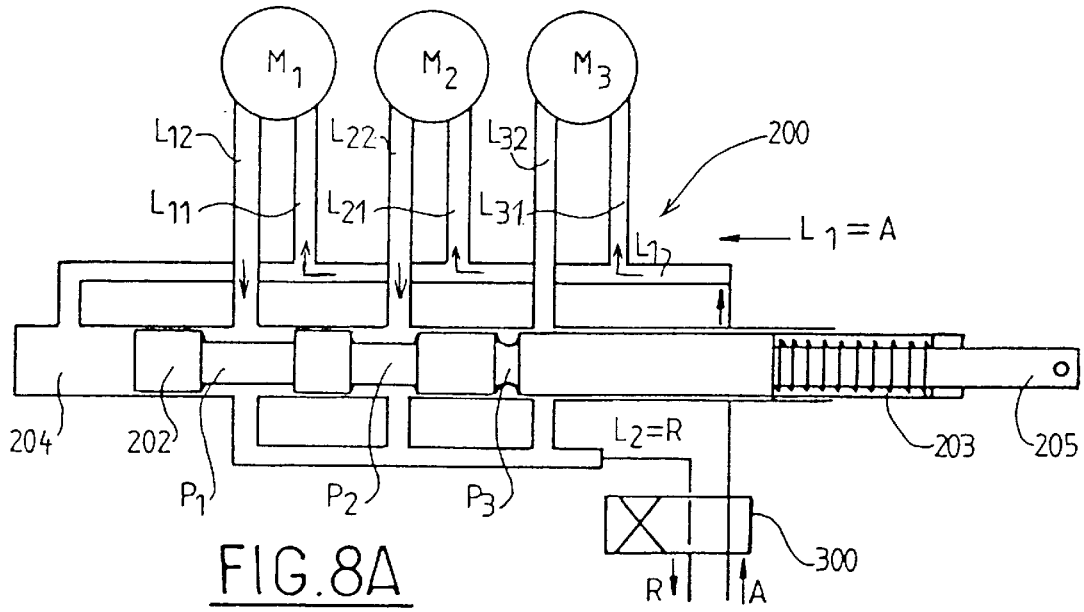
FIGS. 8A, 8B show a regulating device for reversing the direction of travel, into two operating positions.
Figure 8B:
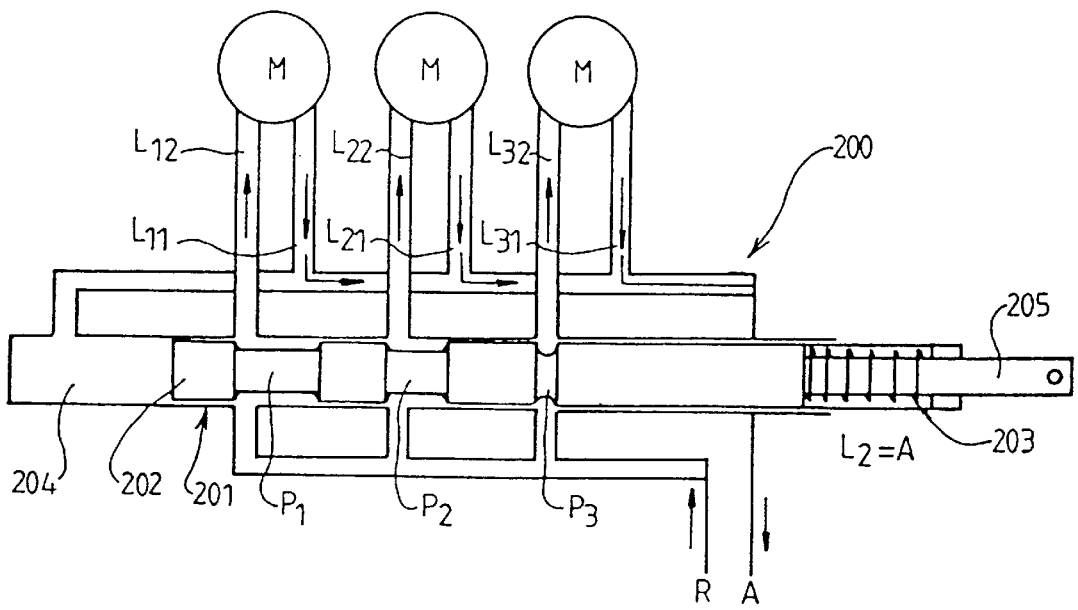

FIGS. 8A, 8B show a regulating device 200 that controls operation by a reversal of movement. Movement reverser 300 is shown in the form of a two-position slide valve distributor connecting inlet A and return R to passageways (L1, L2) or (L2, L1). Device 200 is shown linked to three "planetary drives " M1, M2, M3 like those described above. These "planetary drives " M1, M2, M3 are connected to passageway L1 by passageways L11, L21, L31, respectively. The connection to passageway L2 is effected through a distributor 201 with a slide 202. Slide 202, which has portions P1, P2, P3, is subject to the action of a return spring 203 and the fluid pressure in a chamber 204.

Slide 202 is normally positioned by its rod 205. It can nonetheless retract relative to rod 205 by compressing spring 203. This retraction movement occurs when the pressure in chamber 204 rapidly rises too high when the variable-speed motor reverses movement.

The purpose of this displacement of slide 202 relative to the position controlled by control rod 205 by compressing spring 203, namely rightward in FIG. 8B, is to connect "planetary drives " M1, M2, M3 in parallel at the time of reversal of the direction of operation. This reversal of the direction of operation consists of cross-connecting the supply and the return between passageways L1, L2. At this time a pressure surge occurs which can be very dangerous if the motor is running rapidly. Hence, rightward displacement of slide 202, in the position shown in FIG. 8B, under the effect of the pressure rise so induced in chamber 204, causes the connections to switch to parallel by means of portions P1, P2, P3 of slide 202.

This position is reached, for example, starting from that regulated by handle 205 in FIG. 8A; in this position, slide 202 connects "planetary drives " M1, M2 in parallel while "planetary drive " M3 is disconnected.

In this FIG. 8A, passageway L1 corresponds to inlet A and passageway L2 to return R.

If the inlet and the return are reversed, passageway L2 becomes the inlet and passageway L1 becomes return R (FIG. 8B), and slide 202 is pushed back rapidly rightward to connect the three "planetary drives " M1, M2, M3 in parallel as shown in FIG. 8B in order to make them run more slowly.

It is important for inlets (Ai, $\alpha$i+1) for the drive fluid in a given segment Zi to be diametrically opposite; likewise, returns (Ri, $\rho$i+1). This contributes to balancing planet gears Si in every possible operating case, namely both when the variable-speed motor is supplied in series and when it is supplied in parallel.

Moreover, each planet gear has a lubricated bearing thanks to linking channels that extend radially from the bearing to the gap of a planet gear tooth. Preferably, three channels are provided, 120° apart from each other. An oil film is thus created all around the bearing. This allows regularly distributed lubrication, with hydraulic balancing.

At the contact surfaces of the gear teeth, the outer surfaces of the teeth can be grooved in a particular profile. This extends the lifetime of these gears through better lubrication.

What is claimed is:

1. A hydraulic variable-speed gear motor supplied with drive fluid and supplying a variable torque and speed, having an epicycloidal assembly comprising:

a sun gear, at least two planet gears, a ring gear, an intermediate sector in a shape of a curvilinear quadrilateral occupying a space between sides opposite the sun gear, opposite neighboring planet gears, and opposite the ring gear, matching contours of the sun gear, the neighboring planet gears and the ring gear, and defining circulation paths of the drive fluid therewith, junctions, between the sun gear, the neighboring planet gears and ring gear being impermeable to the drive fluid, inlets and returns for the drive fluid being provided in a sector in a vicinity of the junctions, the inlets and returns being located at opposite vertices of a curvilinear quadrilateral formed by the sector, a controlled supply of the inlets and returns, connected to a hydraulic circuit, the supply allowing the inlets and returns to be connected in parallel or in series or in a combination intermediate between completely series connection and completely parallel connection to modify the torque supplied at the output, and wherein the controlled supply comprises a regulating device which, for movement reversal, automatically controls connection of motors in parallel whatever the connection of the motors before the movement reversal.

2. A variable-speed motor according to claim 1, wherein the controlled supply comprises a movement reverser having a two-position slide valve distributor.

3. A variable-speed motor according to claim 1, wherein the regulating device is comprised of a slide with opening portions of different lengths, the slide being positioned by a control rod having one end not connected to the control which is subject to pressure prevailing in a chamber of the regulating device, the chamber being connected to one of passageways or the reverser and another end of the distributor is urged by a spring abutting the control rod so that a pressure surge generated at the reverser reverses the passage of fluid in the chamber and causes the slide to move against a force developed by the spring abutting the another end to automatically connect all motion in parallel whatever a connection of the motors before reversal.

4. Variable-speed motor according to claim 1 having a demultiplication ratio of 1/4.

5. Variable-speed motor according to claim 2 having a demultiplication ratio of 1/4.

6. Variable-speed motor according to claim 3 having a demultiplication ratio of 1/4.

7. A variable-speed motor according to claim 4, wherein three of the planet gears have 9 teeth, the sun gear has 18 teeth, and the ring gear has 36 teeth.

8. A variable-speed motor according to claim 5, wherein three of the planet gears have 9 teeth, the sun gear has 18 teeth, and the ring gear has 36 teeth.

9. A variable-speed motor according to claim 6, wherein three of the planet gears have 9 teeth, the sun gear has 18 teeth, and the ring gear has 36 teeth.

10. A variable-speed motor according to claim 1 wherein the at least two planet gears have radial channels connecting a bottom of one tooth to a bearing of the planet gear for balancing the bearings hydrodynamically.

11. A variable-speed motor according to claim 2 wherein the at least two planet gears have radial channels connecting a bottom of one tooth to a bearing of the planet gear for balancing the bearings hydrodynamically.

12. A variable-speed motor according to claim 3 wherein the at least two planet gears have radial channels connecting a bottom of one tooth to a bearing of the planet gear for balancing the bearings hydrodynamically.

13. A variable-speed motor according to claim 4 wherein the at least two planet gears have radial channels connecting a bottom of one tooth to a bearing of the planet gear for balancing the bearings hydrodynamically.

14. A variable-speed motor according to claim 5 wherein the at least two planet gears have radial channels connecting a bottom of one tooth to a bearing of the planet gear for balancing the bearings hydrodynamically.

15. A variable-speed motor according to claim 6 wherein the at least two planet gears have radial channels connecting a bottom of one tooth to a bearing of the planet gear for balancing the bearings hydrodynamically.

16. A variable-speed motor according to claim 7 wherein the at least two planet gears have radial channels connecting a bottom of one tooth to a bearing of the planet gear for balancing the bearings hydrodynamically.

17. A variable-speed motor according to claim 8 wherein the at least two planet gears have radial channels connecting a bottom of one tooth to a bearing of the planet gear for balancing the bearings hydrodynamically.

18. A variable-speed motor according to claim 9 wherein the at least two planet gears have radial channels connecting a bottom of one tooth to a bearing of the planet gear for balancing the bearings hydrodynamically.

19. A variable-speed motor according to claim 10 wherein the radial channels are spaced angularly 120° apart from each other.

20. A variable-speed motor according to claim 11 wherein the radial channels are spaced angularly 120° apart from each other.

* * * * *